(12) United States Patent
Rangwalla et al.

(10) Patent No.: US 6,416,817 B1
(45) Date of Patent: Jul. 9, 2002

(54) BARRIER COATINGS HAVING BIS-SILANES

(75) Inventors: Imtiaz J. Rangwalla, Andover, MA (US); John E. Wyman, Sanibel, FL (US); Patrick Jacques Jean Merlin, Belgium (BE); Shrenik Mahesh Nanavati, Midland, MI (US); Laurence Gallez, Belgium (BE)

(73) Assignees: Dow Corning SA, Seneffe (BE); E.G. Technology Partners, L.P., Wilmington, MA (US)

( * ) Notice: Subject to any disclaimer, the term of this patent is extended or adjusted under 35 U.S.C. 154(b) by 0 days.

(21) Appl. No.: 09/517,900

(22) Filed: Mar. 3, 2000

(51) Int. Cl.$^7$ ............................... B05D 3/02; B05D 3/10
(52) U.S. Cl. .................... 427/377; 427/387; 427/388.4; 427/388.5; 427/391; 427/392; 427/393.5
(58) Field of Search ................ 427/385.5, 377, 427/387, 388.4, 388.5, 391, 392, 393.5

(56) References Cited

U.S. PATENT DOCUMENTS

| | | | |
|---|---|---|---|
| 2,832,754 A | | 4/1958 | Kenmore et al. .......... 260/46.5 |
| 2,920,095 A | | 1/1960 | Jex et al. ................. 260/448.8 |
| 4,659,798 A | * | 4/1987 | Pohl et al. ..................... 828/33 |
| 4,689,085 A | | 8/1987 | Plueddemann .............. 106/287 |
| 5,101,055 A | | 3/1992 | Dinh et al. .................. 556/413 |
| 5,215,822 A | | 6/1993 | Wyman et al. ............. 428/447 |
| 5,576,068 A | | 11/1996 | Caburet et al. ............. 427/452 |
| 5,663,215 A | * | 9/1997 | Milligan ..................... 523/122 |

FOREIGN PATENT DOCUMENTS

| | | |
|---|---|---|
| EP | 0 502 274 A2 | 9/1992 |
| EP | 0 671 450 A1 | 9/1995 |
| WO | WO 98/31539 | 7/1998 |
| WO | WO 98/31719 | 7/1998 |
| WO | WO 98/31720 | 7/1998 |
| WO | WO-99/55754 A1 * | 11/1999 |
| WO | WO-00/64647 A1 * | 11/2000 |

* cited by examiner

*Primary Examiner*—Erma Cameron
(74) *Attorney, Agent, or Firm*—James L. De Cesare; Alan Zombeck; Richard I. Gearhart

(57) ABSTRACT

A process of preparing an oxygen barrier coating using a compound of the general formula $$R_aX_{3-a}Si\text{—}Z\text{—}SiX_{3-a}R_a$$

wherein Z is $R'NH(R'NH)_pR'$, each R is selected from the group consisting of a hydrogen atom and a hydrocarbon group, each X is selected from the group consisting of an alkoxy group with 1 to 4 carbon atoms, a halogen atom, an oxime group or an acyloxy group, each R' is a divalent hydrocarbon group having 1 to 12 carbon atoms; a is from 0 to 3 and p is 0 or 1. The invention further comprises compositions incorporating the above compound. Coatings prepared may be used in packaging applications as a top coat, or a primer for further coatings.

14 Claims, No Drawings

BARRIER COATINGS HAVING BIS-SILANES

FIELD OF THE INVENTION

This invention relates to the preparation of barrier coatings on films and particularly to oxygen, carbon dioxide, flavor and aroma barrier coatings on films for use in packaging.

BACKGROUND OF THE INVENTION

The pharmaceutical and food industries have, over recent years, increasingly provided products in a prepackaged form. Fruit and vegetables for example, apples and tomatoes, meat and cheese are often prepackaged in a tray and the tray and the fruit are covered with a transparent film.

One of the most important requirements for films used for packaging applications is that they should protect products from aromas or odors in the vicinity in which the products are stored, i.e. they should act as barriers to such aromas or odors. Similarly the films are utilized as barriers to prevent strong smelling products contained in packages from tainting the surrounding area with their aroma during storage.

Oxygen barrier coatings are utilized to prevent the ingress of oxygen into products with a view to extending the shelf life of products and carbon dioxide barrier coatings are typically utilized to prevent the release of carbon dioxide from rigid plastic bottles holding carbonated drinks.

U.S. Pat. No. 5,215,822, describes a process of controlling the impermeability of a film to gases by mixing a vinyl benzylamine silane with an ethylenically unsaturated carboxylic acid e.g. itaconic acid, in a solvent, solubilising, hydrolyzing and equilibrating the resultant solution and coating this solution on a corona treated low density polyethylene film and drying the resulting film. The coated film is then subjected to an electron beam radiation to graft the coating to the film surface and further improve the barrier properties of the silane coating. The vinyl benzyl amine silane was also co-polymerised with 3-(2-aminoethyl)-aminopropyl trimethoxy silane or gamma aminopropyltriethoxysilane prior to mixing with the acid. The resultant mixture was then used to coat the relevant substrate. While these coatings gave excellent gas barrier properties at low to moderate relative humidity values, the gas permeability was less satisfactory at very high relative humidity values. In addition, the use of electron beam radiation may lead to cross-linking or chain scission in underlying plastics substrates, with concomitant loss of tensile properties. The use of electron beam radiation and several other complicated and/or expensive procedures with respect to coatings of this type containing mono-silyl constituents can make the use of such compounds for the manufacture of coated films for use in the packaging industry unattractive.

U.S. Pat. No. 4,689,085/U.S. Pat. No. Re. 34675 describes the preparation of disilylated hydrocarbons of the general structure $(RO)_3SiR'Si(OR)_3$ where OR is a hydrolysable group and R' is a divalent organic radical. They further teach the combination of a silane coupling agent for example, 3-methacryloxypropyltrimethoxysilane with a disilyl cross-linking compound of the general formula structure $(RO)_3SiR'Si(OR)_3$ where OR is a hydrolysable group and R' is a divalent organic radical for example, an alkylene group or a selection of branched, unsaturated or aryl substituted groups as an improved coupling agent and primer mixture demonstrating that the combination of the components provided improved results compared with either component when used alone.

These compositions are said to be useful as primer coatings between non-particulate surfaces and polymer coatings as pretreatments for particulate fillers before compounding, and as additives to filled polymer systems during compounding as well as for treating glass cloth.

Various proposals to employ organosilicon compounds in the treatment of plastics films to achieve gas barrier properties have been made. However, bis-silanes have not previously been utilized to control the gas barrier properties of a substrate. Furthermore, it is to be noted that none of the prior art discussed above suggests the use of such compounds for coating materials to be cured on plastic, cellulosic, glass or metal substrates to achieve gas barrier properties.

It is one of the various objects of the present invention to provide a process for treating a surface of a substrate to provide improved barrier properties.

The present inventors have now surprisingly found that substrates having coatings of selected moisture cured disilylated secondary amines demonstrate excellent gas barrier properties at low to high relative humidity values. Furthermore, these properties may be achieved without the need for exposure of the coating to electron beam or other forms of ionizing radiation.

SUMMARY OF THE INVENTION

The present invention provides, in accordance with one of its aspects, a process for treating a surface of a substrate with a compound of the general formula

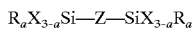

wherein Z is $R'NH(R'NH)_pR'$, each R is selected from the group consisting of a hydrogen atom and a hydrocarbon group, each X is selected from the group consisting of an alkoxy group with 1 to 4 carbon atoms, a halogen atom, an oxime group or an acyloxy group, each R' is a divalent hydrocarbon group having 1 to 12 carbon atoms; a is from 0 to 3 and p is 0 or 1; which process comprises applying the compound on to the substrate to form a layer and exposing the layer to moisture.

DETAILED DESCRIPTION OF THE INVENTION

In a process according to the present invention there is used a compound of the general formula

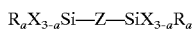

wherein Z is $R'NH(R'NH)_pR'$.

In this formula each R is preferably a hydrogen atom or a hydrocarbon group having 1 to 10 carbon atoms, for example a saturated or unsaturated aliphatic or aromatic group, for example alkyl alkenyl or phenyl groups; preferred groups are methyl and ethyl, the most preferred of which are methyl groups. Each X is an alkoxy group with 1 to 4 carbon atoms, a halogen atom, an oxime group or an acyloxy group, of these methoxy and ethoxy groups are preferred, the most preferred being methoxy groups. R' may be a divalent hydrocarbon group having 1 to 12 carbon atoms, preferably each R' has from 2 to 3 carbon atoms. Each a is from 0 to 3 but is most preferably 0, and p is 0 or 1. The best results are obtained by use of compounds in which each X is a methoxy group, each R' is a propylene group, a is 0, and p is 0, i.e. when the compound is bis-(gamma-trimethoxysilylpropyl)amine.

These materials, referred to as disilylated secondary amines may be prepared by processes known in the art for example, as disclosed in U.S. Pat. Nos. 2,832,754, 2,920,095, and 5,101,055.

In a process according to the invention the surface of a substrate is treated with a compound as aforesaid with or without the addition of:

i) a solvent selected from the group consisting of an alcohol, an ether, an ester, a hydrocarbon, and water in the presence of a polybasic acid;

ii) an organic acid having two or more acid substituents wherein the organic acid is a polybasic carboxylic acid selected from the group consisting of itaconic acid, citric acid, succinic acid, butane tetracarboxylic acid, ethylene diamine tetracetic acid, ascorbic acid, tetrahydrofuran tetracarboxylic acid, cyclopentane tetracarboxylic acid, and benzene tetracarboxylic acid;

iii) a polymer or co-polymer of an unsaturated carboxylic acid selected from the group consisting of itaconic, citraconic, mesaconic, maleic, fumaric, acrylic, methacrylic, sorbic, cinnamic acid, wherein the co-polymer is a co-polymer with any appropriate unsaturated monomer selected from the group consisting of one or more other unsaturated carboxylic acids, ethylene, propylene, styrene, butadiene, acrylamide and acrylonitrile;

iv) a condensation catalyst;

v) a filler selected from the group consisting of silicone resin, silica, magnesium oxide, clay, diatomaceous earth, calcium carbonate, finely ground quartz and nanoparticles.

While the process of the present application may proceed using a solventless system, the compound may be dissolved in a solvent (i) and subsequently applied in solution. This is usually carried out with a view to reduce the total solids applied and so control coat weight during application, particularly in relation to cases where a catalyst is being used. In general, alcohols and blends thereof are suitable solvents because compounds of the present invention are soluble therein. The selected solvent must wet the substrate. Preferably, the solvent is non-toxic, and does not extend the drying time of the layer beyond a commercially acceptable period. The amount of solvent may range from about 1 to about 99 parts by weight and is preferably from about 50 to about 95 parts by weight of the total composition.

Preferred solvents (i) are alcohols for example, methanol, ethanol, n-propanol, isopropanol, butanol, and 1-methoxy-2-propanol, the most preferred solvent being methanol. Alternative solvents which may be utilized include an ether, for example ethyl ether, an ester for example ethyl acetate, a hydrocarbon for example cyclohexane, and water in the presence of a polybasic acid. It was found that a solution of the compound in water alone almost immediately formed a gel whereas an aqueous solution was stable in the presence of a polybasic acid.

The organic acid (ii) may be added to the compound whether or not water is the solvent being used and may be selected from the group consisting of itaconic acid, citric acid, succinic acid, butane tetracarboxylic acid, ethylene diamine tetracetic acid, ascorbic acid, tetrahydrofuran tetracarboxylic acid, cyclopentane tetracarboxylic acid, and benzene tetracarboxylic acid.

The polymer or co-polymer of an unsaturated carboxylic acid (iii) may be prepared from one or more unsaturated carboxylic acids selected from the group consisting of itaconic, citraconic, mesaconic, maleic, fumaric, acrylic, methacrylic, sorbic, and cinnamic acids. The co-polymers may be co-polymers with other unsaturated carboxylic acids or any other unsaturated monomer, for example, monomers selected from the group consisting of ethylene, propylene, styrene, butadiene, acrylamide and acrylonitrile.

The condensation catalyst (iv) may be used with the compound to catalyze the cure process. The compound, when used in the process of the present invention always contains at least one secondary amine group, and therefore will always self catalyze the cure reaction to some extent. However, the cure may be accelerated by use of a catalyst. Furthermore, compounds of a similar structure not having an amine group present, as used in the examples for comparative purposes, will require a catalyst to at least initiate cure. Any suitable condensation catalyst may be added, for example, tin and titanium compounds or amines may be utilized.

Any appropriate filler (v) may be added to the compound. The filler may be selected from, for example, silica, magnesium oxide, clay, diatomaceous earth, calcium carbonate, finely ground quartz, and nanoparticles. Silicon containing nanoparticles such as silicates, for example exfoliated vermiculite, montmorillonite and apophyllite, may be added to the compound in order to reduce the thickness and/or weight of the resultant coating. This would be particularly usefull if the nanoparticles were exfoliated after having been thoroughly mixed into a compound or mixture prior to applying the layer to the substrate.

In a process according to the invention the layer may be applied on to a wide variety of substrates, including, but not limited to polyolefins, including oriented polypropylene (OPP), cast polypropylene, polyethylene, polystyrene; polyolefin copolymers, including ethylene vinyl acetate, ethylene acrylic acid, ethylene vinyl alcohol (EVOH), ionomers, polyvinyl alcohol and copolymers thereof; polyacrylonitrile; polyvinyl chloride, polyvinyl dichloride, polyvinylidene chloride and polyacrylates.

Further alternative substrates include polyesters, for example, polyethylene terephthalate (PET) or polyethylene naphthalate (PEN); polyamides for example, nylon and meta-xylene adipamide (MXD6), and polyimides.

Even further possible substrates include polysaccharides, for example, regenerated cellulose, glassine or clay coated paper, paperboard or Kraft paper or metallised polymer films and vapor deposited metal oxide coated polymer films for example, $AlO_x$, $SiO_x$, or $TiO_x$.

The layer applied according to the invention may be applied to the aforesaid substrates when they are in the form of a film or sheet or molding, though this is not obligatory. The substrate may be selected from a copolymer, a laminate, a blend, a coating or co-extruded or a combination of any of the substrates listed above according to the compatibility of the materials concerned with each other. In addition, the substrate may be in the form of a rigid container made from materials such as polyethylene, polypropylene, polystyrene, polyamide, PET, polymers of EVOH, or laminates containing such materials. The layer may be applied onto a substrate in any desired amount; however, it is preferred that the layer be applied in an amount suitable to form a coating weight on the substrate of from about 0.05 to about 20 $g/m^2$. Preferably the coating weight is from about 0.5 to about 10 $g/m^2$, and most preferably is from 0.5 to 3$g/m^2$. Coating weights may be determined by gravimetric comparison. The layer may be applied to the substrate by any conventional process, for example, spray coating, roll coating, slot coating, meniscus coating, immersion coating, and direct, offset, reverse gravure coating, and Myer rod.

In a process according to the invention the layer is exposed to moisture and it is believed that curing of the compound occurs thereby. The layer may be exposed to heat at the same time as it is exposed to moisture. The curing process may additionally involve the application of heat in order to optimize and accelerate the cure process. Generally, the higher the temperature, the faster the coating will solidify. Furthermore, heating in the presence of moisture will accelerate both the rate of hydrolysis of silicon-alkoxy groups and the rate of condensation of silicon bonded alkoxy groups to form silicon-oxygen-silicon linkages.

The upper temperature limit for the heating step is the temperature above which the substrate will undergo an unacceptable degree of distortion. In the present invention it has been found that the layer may be dried to form a coating at any temperature from room temperature up to about 140° C., with temperatures of from about 60° C. to about 120° C. being preferred and temperatures of about 90° C. to about 110° C. being most preferred. The time period over which the layer may be heated is, as might be expected, temperature dependent and at the most preferred temperature range referred to above the resultant coating will become tack free in a period of from 1 to 10 seconds.

In cases where a solvent is present, the heating step in a process in accordance with the invention becomes of increased importance as it not only serves as a means of accelerating the curing process but also serves as a means of evaporating the solvent in the layer.

If desired, substrates used in a process according to the invention may be pretreated prior to application of the layer, for example, by corona treatment, plasma treatment, acid treatments and/or flame treatments, all of which are known in the art. Furthermore, any of the foregoing substrates may have a primer or primers applied thereon prior to application of the layer. The primers may be applied to the substrates by any appropriate process known in the art, for example, spray coating, roll coating, slot coating, meniscus coating, immersion coating, and indirect, offset, and reverse gravure coating and extrusion coating. Suitable primers may include, but are not limited to carbodiimide, polyethylenimine, and silanes, for example, N-(2-aminoethyl)-3-aminopropyltrimethoxy silane and aminopropyltriethoxysilane.

Substrates treated by a process according to the invention may be subsequently used without further treatment. However, it is possible to bring a second substrate as described above, into contact with a first substrate under adhesive bond forming conditions, in which case the compound alone or in combination with other additives serve as a primer or adhesive. When two substrates are present, the application of the compound and the first and second substrates may be in a continuous process where the application of the compound onto the first substrate and the second substrate onto the compound occurs substantially simultaneously. Alternatively a stepwise process may be utilized wherein the layer is initially applied onto the first substrate and subsequently the second substrate is applied onto the layer.

The additional coatings may be for example, metallic top coats for example, metallised coatings using aluminum or alternatively vapor deposited metal oxide coatings of $AlO_x$, $SiO_x$ or $TiO_x$. Packaging requiring metallised or vapor deposition metal oxide coatings may use coatings prepared in accordance with the process of the present invention as primers. There has, for a long time, been a problem with metallised films of this type in that whilst such films provide high barrier levels with respect to gases, aroma and moisture, the metal layer itself is very often a weak point due to surface defects in and/or lack of adhesion of the metallised layer to the flexible plastic substrate.

Oxygen, carbon dioxide, aroma and flavor barrier coatings as prepared by treating substrates using a process according to the invention may be used for a wide variety of packaging containers, for example, pouches, tubes, bottles, vials, bag-in-boxes, stand-up pouches, gable top cartons, thermo-formed trays, brick-packs, boxes, cigarette packs and the like. They may also be used in any application wherein gas, or aroma barrier properties are desired, for example, tyres, buoyancy aides, inflatable devices generally.

For packaging applications where a barrier coating as opposed to an adhesive layer is utilized one of the most useful applications is where oriented polypropylene film is the substrate. By use of a process according to the invention one may provide coated substrates which have a significant barrier effect at high relative humidities e.g. 80% to meet the goals of the packaging industry i.e. coatings with oxygen transmission rates (OTR) of less than 0.00015 $m^3/m^2$/day for oriented polypropylene. For example, a 30 micron uncoated biaxially oriented, corona treated polypropylene film is generally found to have a permeability to oxygen of 0.0015 $m^3/m^2$/day as measured at ASTM D3985-81 measured at 80% relative humidity. Such films when treated in accordance with a process of the present invention can, in some instances, have an OTR of less than 0.000005 $m^3/m^2$/day.

The invention provides in another of its aspects an oxygen, odor or flavor barrier coating composition comprising a compound of the general formula:

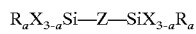

wherein Z is R'NH(R'NH)$_p$R'; and wherein each R is selected from the group consisting of a hydrogen atom and a hydrocarbon group, each X is selected from the group consisting of an alkoxy group with 1 to 4 carbon atoms, a halogen atom, an oxime group or an acyloxy group, each R' is a divalent hydrocarbon group having 1 to 12 carbon atoms; a is from 0 to 3 and p is 0 or 1; and one or more constituents selected from the group consisting of:

i) a solvent selected from the group consisting of an alcohol, an ether, an ester, a hydrocarbon, and water in the presence of a polybasic acid;

ii) an organic acid having two or more acid substituents wherein the organic acid is a polybasic carboxylic acid selected from the group consisting of itaconic acid, citric acid, succinic acid, butane tetracarboxylic acid, ethylene diamine tetracetic acid, ascorbic acid, tetrahydrofuran tetracarboxylic acid, cyclopentane tetracarboxylic acid, and benzene tetracarboxylic acid;

iii) a polymer or co-polymer of an unsaturated carboxylic acid selected from the group consisting of itaconic, citraconic, mesaconic, maleic, fumaric, acrylic, methacrylic, sorbic, and cinnamic acid, wherein the co-polymer is a co-polymer with any appropriate unsaturated monomer selected from the group consisting of one or more other unsaturated carboxylic acids, ethylene, propylene, styrene, butadiene, acrylamide and acrylonitrile;

iv) a condensation catalyst; and v) a filler selected from the group consisting of silicone resin, silica, magnesium oxide, clay, diatomaceous earth, calcium carbonate, finely ground quartz and nanoparticles.

In a still further aspect of the invention there is provided the use of a compound of the general formula

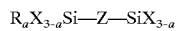

wherein Z is R'NH(R'NH)$_p$R'; and wherein each R is selected from the group consisting of a hydrogen atom and a hydrocarbon group, each X is selected from the group consisting of an alkoxy group with 1 to 4 carbon atoms, a halogen atom, an oxime group or an acyloxy group, each R' is a divalent hydrocarbon group having 1 to 12 carbon atoms, a is from 0 to 3 and p is 0 or 1; in or for an oxygen, odor or flavor barrier coating.

One major advantage of the present invention over recent prior art is that no ionizing radiation, such as electron beam or ultra violet radiation is required to cure the layer.

A further advantage of coatings prepared by the process of this invention is that they provide significantly improved abrasion resistance compared to uncoated substrates. In order that the invention may become more clear there now follows a detailed description of several coatings prepared in accordance with the present invention. Other coatings using a variety of aminosilanes are provided as comparative examples. The tests were carried out with respect to oxygen transmission rate (OTR) at several Relative Humidities (RH). It is to be appreciated that generally if coatings are barriers to oxygen they are also barriers to odors and flavors.

In each of the following Tables the values of OTR are given in the units of $10^{-6}$ $m^3/m^2/day$. In all the following examples oxygen transmission rate (OTR) was determined using a MOCON® Ox-Tran 2–20 apparatus having a COU-LOX® coulometric sensor. Each substrate having a dried/cured layer of the compound thereon was clamped into a diffusion cell forming a divide between two chambers. Both chambers are then purged of oxygen using an oxygen free carrier gas which is usually a mixture of 3% by volume of hydrogen in nitrogen. Oxygen is introduced into the first chamber and is allowed to permeate through the sample into the second chamber wherein any oxygen molecules present are transported by the carrier gas to the sensor. The signals received at the sensor are caused by the reaction between the oxygen and hydrogen.

EXAMPLE 1

Each compound under investigation was dissolved in a 20% solution of methanol. A layer of each solution was applied onto samples of corona treated oriented polypropylene using an air-driven mechanical bench-top coater, a green K-bar (RK coater, theoretical wet deposit 24 μm). Once applied the layer was dried in ambient air without the need for any additional moisture and/or heat. Typically the ambient conditions were temperatures of from 22 to 28° C. at a relative humidity of from 30 to 60% inclusive. The resultant coatings were visibly dry within only a few minutes, and tack free within 30 minutes but were left to dry for longer periods to ensure that the layer was completely cured prior to OTR testing. Coat weights were determined by measuring the change in weight of the samples of orientated polypropylene before and after the application and curing of the layer and were found to be in the range of from 2 to 3 $g/m^2$. The results from the above tests are shown below in Table 1–4.

Table 1 shows the results from using bis-(gamma-trimethoxysilylpropyl)amine, a composition within the scope of the invention. It shows excellent barrier results at 80 and 90% relative humidities. Table 2 shows comparison compositions outside the scope of the claimed invention. The barrier results are not nearly as good as those shown in Table 1.

TABLE 1

| Compound | 80% RH | 90% RH |
|---|---|---|
| $(MeO)_3Si—CH_2—CH_2—CH_2—NH—CH_2—CH_2—CH_2—Si(OMe)_3$ | 5 | 5 |

TABLE 2

| Comparison Compounds | 80% RH | 90% RH |
|---|---|---|
| $(MeO)_3Si—CH_2—CH_2—CH_2—NH_2$ | 1300 | 1216 |
| $(MeO)_3Si—CH_2—CH_2—CH_2—NH—CH_2—CH_2—NH_2$ | 1084 | 1339 |
| $(MeO)_3Si—CH_2—CH_2—CH_2—NH—CH_2—CH_2\ NH—CH_2—CH_2—NH_2$ | 1183 | 1340 |
| $(MeO)_3Si—CH_2—CH_2—CH_2—NH—CH_2—CH_2\ NH—CH_2—CH_2—NH—CH_2—CH_2—CH_2—CH_2—Si(OMe)_3$ (+ isomers) | 659 | |
| $(MeO)_3Si—CH_2—CH_2—CH_2—NH—C(O)—NH—CH_2—CH_2—CH_2—Si(OMe)_3$ | 1322 | |
| $(MeO)_3Si—CH_2—CH_2—CH_2—NH—CH_2—CH_2\ NH—C(O)—NH—CH_2—CH_2—CH_2—CH_2—Si(OMe)_3$ (+ isomers) | 352 | |
| $(MeO)_3Si—CH_2—CH_2—CH_2—NH—C(O)—N(CH_2—CH_2—CH_2—Si(OMe)_3)_2$ | 1600 | |

Table 3 shows the results from using bis-(gamma-triethoxysilylpropyl)amine, a composition within the scope of the invention. It shows excellent barrier results at 50 and 90% relative humidities. Table 4 shows comparison compositions outside the scope of the claimed invention. The barrier results are not nearly as good as those shown in Table 3.

TABLE 3

| Compound | 50% RH | 80% RH |
|---|---|---|
| $(EtO)_3Si—CH_2—CH_2—CH_2—NH—CH_2—CH_2—CH_2—Si(OEt)_3$ (20% solution in ethanol) | 39 | 148 |

TABLE 4

| Compound | 50% RH | 80% RH |
|---|---|---|
| (EtO)$_3$Si—CH$_2$—CH$_2$—Si(OEt)$_3$, | 1040 | 839 |
| Cl$_3$Si—CH$_2$—CH$_2$—CH$_2$—CH$_2$—CH$_2$—CH$_2$—SiCl$_3$ | 1248 | |
| (AcO)$_3$Si—CH$_2$—CH$_2$—CH$_2$—CH$_2$—CH$_2$—CH$_2$—Si(OAc)$_3$ | 1012 | 1080 |
| Cl$_3$Si—CH$_2$—SiCl$_3$ | 1153 | 1184 |
| (MeO)$_3$Si—CH$_2$—CH$_2$—CH$_2$—NH—CH$_2$—CH$_2$ NH—CH$_2$—CH$_2$—NH—CH$_2$—CH$_2$—CH$_2$—CH$_2$—Si(OMe)$_3$ (+ isomers) | — | 659 |
| (MeO)$_3$Si—CH$_2$—CH$_2$—CH$_2$—NH—C(O)—NH—CH$_2$—CH$_2$—CH$_2$—Si(OMe)$_3$ | 1367 | 1322 |
| (MeO)$_3$Si—CH$_2$—CH$_2$—CH$_2$—NH—CH$_2$—CH$_2$ NH—C(O)—NH—CH$_2$—CH$_2$—CH$_2$CH$_2$—Si(OMe)$_3$ (+ isomers) | 888 | 352 |
| (MeO)$_3$Si—CH$_2$—CH$_2$—CH$_2$—O—CH$_2$—CH(OH)—CH$_2$ NH—CH$_2$—(C$_6$H$_6$)—CH$_2$—NH—CH$_2$—CH(OH)—CH$_2$—O—CH$_2$—CH$_2$CH$_2$—Si(OMe)$_3$ (+ isomers) | 28 | 205 |
| (MeO)$_3$Si—CH$_2$—CH$_2$—CH$_2$—S—CH$_2$—CH$_2$—CH$_2$—Si(OMe)$_3$ | 475 | 916 |
| (MeO)$_3$Si—CH$_2$—CH$_2$—CH$_2$—S—CH$_2$—CH$_2$—Si(OMe)$_3$ | 387 | 583 |

EXAMPLE 2

Solutions of bis-(gamma-trimethoxysilylpropyl)amine, and either a polybasic organic acid or a polymer or co-polymer of an unsaturated carboxylic acid were prepared in methanol. Samples of the solutions were then applied on to oriented polypropylene substrates to form a layer, and the resultant layer was cured using the process of example 1. The acid component was dissolved in solvent prior to addition of the compound. Any other additives, for example, condensation catalysts and wetting agents are added last. Table 4a lists the OTR results for coatings prepared as described above.

TABLE 4A

| Acid constituent (ratio of acid to compound) | Additional constituents | Type of cure | OTR 50% RH | OTR 80% RH |
|---|---|---|---|---|
| Itaconic acid (1:1) | | dried at Room temperature (R.T.) | 2 | 4 |
| A-1170/cyclopentane-tetracarboxylic acid (1:1) | | dried at R.T. | 1 | 140 |
| Tetrahydrofuran-tetracarboxylic acid (1:1) | | dried at R.T. | 1 | 104 |
| polyitaconic acid (3:2) | | dried at R.T. | 74 | 64 |
| polyitaconic acid (2:3), | | dried at R.T. (EB) at 170 kV (15 Mrad) | | 51 |
| polyitaconic acid, (1:4) | | dried at R.T. (EB) at 130 kV, 5 Mrad. | | 7 |
| 1,2,4,5-benzene-tetracarboxylic acid (1:1) | | dried at R.T. | 1 | 14 |
| Bu(COOH)/PEI/Bu(COOH)$_4$ (1:1) | 0.1% Glucopon 650 EC/HH | dried at R.T. | 10 | 104 |

In each case the layer formed on the substrate was cured by drying at room temperature (RT) in the presence of moisture unless otherwise indicated. It will be noted that two examples were subjected to an electron beam subsequent to drying in order to assess if any advantage is obtained by utilizing this process. As will be seen from the OTR results for these samples no significant advantage was apparent.

In the case of the last result in Table 3, 0.1% by weight of a wetting agent Glucopon 650 EC/HH (obtained from Henkel GmbH) was used to assist in the wetting of the oriented polypropylene substrate.

EXAMPLE 3

The following example compares the OTR of a variety of untreated substrates with substrates treated with a compound in accordance with the process of the present invention as described in example 1 unless otherwise indicated. The OTR value of the uncoated substrates measured at 80% relative humidity were for 30 µm oriented polypropylene film (OPP) 1543 m$^3$/m$^2$/day, 50 µm low density polyethylene film (LDPE) 4469 m$^3$/m$^2$/day, 12 µm polyethylene terephthalate film (PET) 115 m$^3$/m$^2$/day, and 15 µm polyamide film (OPA) 95 m$^3$/m$^2$/day.

Table 5 shows OTR values of the treated substrates. It is evident from the values obtained that in each example the treated substrates provide significantly improved barrier properties when compared with the uncoated films.

TABLE 5

| Compound | Substrate | 50% RH | 80% RH | 90% RH |
|---|---|---|---|---|
| (MeO)$_3$Si—CH$_2$—CH$_2$—CH$_2$—NH—CH$_2$—CH$_2$—CH$_2$—Si(OMe)$_3$ | 50 μm LDPE | — | 256 | — |
| (MeO)$_3$Si—CH$_2$—CH$_2$—CH$_2$—NH—CH$_2$—CH$_2$—CH$_2$—Si(OMe)$_3$ | 12 μm PET | — | 5 | |
| (MeO)$_3$Si—CH$_2$—CH$_2$—CH$_2$—NH—CH$_2$—CH$_2$—CH$_2$—Si(OMe)$_3$ | 15 μm OPA | — | 26 | 12 |
| (MeO)$_3$Si—CH$_2$—CH$_2$—CH$_2$—NH—CH$_2$—CH$_2$—NH—CH$_2$—CH$_2$—CH$_2$—Si(OMe)$_3$, | 12 μm PET | 22 | 38 | |
| (MeO)$_3$Si—CH$_2$—CH$_2$—CH$_2$—NH—CH$_2$—CH$_2$—NH—CH$_2$—CH$_2$—CH$_2$—Si(OMe)$_3$, | 50 μm LDPE | 353 | 218 | — |
| (MeO)$_3$Si—CH$_2$—CH$_2$—CH$_2$—NH—CH$_2$—CH$_2$—CH$_2$—Si(OMe)$_3$/itaconic acid (1:1), | 30 μm OPP | 2 | 4 | 60 |
| (MeO)$_3$Si—CH$_2$—CH$_2$—CH$_2$—NH—CH$_2$—CH$_2$—CH$_2$—Si(OMe)$_3$/itaconic acid (1:1) | 12 μm PET | 5 | 41 | — |
| (MeO)$_3$Si—CH$_2$—CH$_2$—CH$_2$—NH—CH$_2$—CH$_2$—CH$_2$—Si(OMe)$_3$/itaconic acid (1:1) | 15 μm OPA | 17 | 55 | — |
| (MeO)$_3$Si—CH$_2$—CH$_2$—CH$_2$—NH—CH$_2$—CH$_2$—CH$_2$—Si(OMe)$_3$/butanetetracarboxylic acid (1:1) | 30 μm OPP | 2.8 | 2.4 | 17 |
| (MeO)$_3$Si—CH$_2$—CH$_2$—CH$_2$—NH—CH$_2$—CH$_2$—CH$_2$—Si(OMe)$_3$/poly(acrylic acid) (1:1) | 30 μm OPP | | 20 | 257 |
| (MeO)$_3$Si—CH$_2$—CH$_2$—CH$_2$—NH—CH$_2$—CH$_2$—CH$_2$—Si(OMe)$_3$/poly(itaconic acid) (3:2) | 12 μm PET | 10 | 42 | |
| (MeO)$_3$Si—CH$_2$—CH$_2$—CH$_2$—NH—CH$_2$—CH$_2$—NH—CH$_2$—CH$_2$—CH$_2$Si(OMe)$_3$/itaconic acid (1:1) | 30 μm OPP | 75 | 513 | — |
| (MeO)$_3$Si—CH$_2$—CH$_2$—CH$_2$—NH—CH$_2$—CH$_2$—CH$_2$—Si(OMe)$_3$/poly(itaconic acid) (3:2) | 50 μm LDPE | | 147 | — |

EXAMPLE 4

This example compares OTR of substrates treated by a compound in accordance with the process of the present invention, either in the absence of a solvent or in ethyl acetate. Again significantly improved OTR results are shown in Table 6 when compared with those for untreated substrates. Coating compositions were prepared by dissolving each compound in a 31% solution of methanol. 5.7 weight % of a titanate condensation catalyst, diisopropoxytitanium bis ethylacetoacetate), was also added to the solution. Each solution was applied onto a sheet of oriented polypropylene to form a layer using a #18 Meyer rod (theoretical wet deposit 46 μm). In the case of neat, i.e., undiluted compounds the layers were applied onto oriented polypropylene using a #2 (red) Kbar. The layer was then cured in the presence of moisture in an oven at 60° C. for 10 minutes.

EXAMPLE 5

The addition of a polybasic acid to water prior to adding the compounds of the present invention results in a stabilized solution. A specific example of this process is described below:

A solution of 10 g of 1,2,3,4,-butanetetracarboxylic acid, obtained from Aldrich, was prepared in 80 g. of demineralised water, and 10 g. of (MeO)$_3$Si—CH$_2$—CH$_2$—CH$_2$—NH—CH$_2$—CH$_2$—CH$_2$—Si(OMe)$_3$ sold as Silquest A-1170 silane, obtained from Witco, was added upon vigorous stirring. In order to help the wetting of a substrate, a wetting agent, 0.05 g. of Volpo T7/85 obtained from Croda Chemicals was added to the solution and the solution was applied to a freshly corona treated oriented polypropylene sheet using a #3 (green) meter bar obtained from RK. Testing of the oxygen permeability after drying at room temperature for 24 hours showed a measure of 0.000057 m$^3$/m$^2$d at 80% relative humidity.

TABLE 6

| Composition | Substrate | 50% RH | 80% RH | 90% RH |
|---|---|---|---|---|
| (MeO)$_3$Si—CH$_2$—CH$_2$—CH$_2$—NH—CH$_2$—CH$_2$—CH$_2$—Si(OMe)$_3$, 20% solids in EtOAc, | 30 μm OPP | — | 5.5 | — |
| (MeO)$_3$Si—CH$_2$—CH$_2$—CH$_2$—NH—CH$_2$—CH$_2$—CH$_2$—Si(OMe)$_3$, coated neat | 30 μm OPP | 73 | | 54 |
| (MeO)$_3$Si—CH$_2$—CH$_2$—CH$_2$—NH—CH$_2$—CH$_2$—NH—CH$_2$—CH$_2$—CH$_2$Si(OMe)$_3$, coated neat | 30 μm OPP | 62 | 24 | 67 |

Table 7 shows the barrier properties achieved by coating oriented polypropylene substrates with aqueous coating compositions. It will be noted that in each case an additional wetting agent was utilized.

TABLE 7

| Composition | Substrate | 80% RH |
|---|---|---|
| bis(gamma-trimethoxysilylpropyl)amine/1,2,3,4-butanetetracarboxylic acid, 20% solution in water + 0.1% w/w Dow Corning Q2-5211 | 30 μm OPP | 142 |
| bis(gamma-trimethoxysilylpropyl)amine/1,2,3,4-butanetetracarboxylic acid, 20% solution in water + 0.1% Volpo T7/85 | 30 μm OPP | 57 |
| bis(gamma-trimethoxysilylpropyl)amine/1,2,3,4-butanetetracarboxylic acid, 20% solution in water + 0.1% Hydropalat 3087 | 30 μm OPP | 54 |

EXAMPLE 6

It was also determined that coatings prepared in accordance with the process of the present invention could be used as laminate primers or part of laminate adhesive systems. The following two specific examples show how the two laminate systems shown in Table 8 were prepared: A solution of 20 g. of bis(gamma-trimethoxysilylpropyl)amine (Silquest A-1170 silane from Witco) was prepared in 80 g. of HPLC grade methanol from Aldrich. The coating solution was applied to a freshly corona treated polyethylene terephthalate film using a #3 (green) meter bar obtained from RK and dried at room temperature for 20 min to give film #1. A solution of 60 g. of Adcote 301A and 40 g. of Adcote 350A (both obtained from Morton), was prepared in 86 g. of HPLC grade ethyl acetate obtained from Aldrich. The adhesive solution was applied to a freshly corona treated LDPE film and the solvent was allowed to evaporate for 20 min. to give film #2. Film #1 was laminated to Film #2 (the barrier coating side being in contact with the adhesive side) at a temperature of 60° C. and nip pressure of 275.8×10$^3$ Pa (40 psi), using a bench-top heated roll laminator from Chemsultants International Network.

A solution of 20 g. of bis(gamma-trimethoxysilylpropyl)amine (Silquest A-1 1170 silane from Witco was prepared in 80 g. of HPLC grade methanol from Aldrich. The coating solution was applied to a freshly corona treated polyethylene terephthalate film using a #3 (green) meter bar obtained from RK and dried at room temperature for 20 min to give film #1. A solution of 1-6611 barrier adhesive from Dow Corning (20% solids in isopropyl alcohol/water 1:1) was applied to a freshly corona treated LDPE film and the solvent was allowed to evaporate for 20 minutes to give film #2. The coated side of film #1 was brought in contact with the coated side of film #2 and the resulting structure was laminated at a temperature of 60° C. and nip pressure of 275.8×10$^3$ Pa (40 psi), using a bench-top heated roll laminator from Chemsultants International Network. The resulting laminate was electron beam cured using a CB 150 Electrocurtain equipment from Energy Science Inc., using a voltage of 170 kV and a dose of 10 Mrad. The oxygen permeability of the laminate was 1.9 cc/m$^2$.d at 90% relative humidity. The results are tabulated below:

TABLE 8

| Laminated structures | Substrate | 50% RH | 80% RH | 90% RH |
|---|---|---|---|---|
| PET/(MeO)$_3$Si—CH$_2$—CH$_2$—CH$_2$—NH—CH$_2$—CH$_2$—CH$_2$—Si(OMe)$_3$/ PU adhesive/LDPE | 12 μm PET + 50 μm LDPE | 38 | 21 | 6 |
| PET/(MeO)$_3$Si—CH$_2$—CH$_2$—CH$_2$—NH—CH$_2$—CH$_2$—CH$_2$—Si(OMe)$_3$/ Dow Corning 6611 adhesive/LDPE | 12 μm PET + 50 μm LDPE | 0.4 | 1.8 | 1.9 |

EXAMPLE 7

The resistance to abrasion of samples of a 30μ film of OPP treated by the process in accordance with the invention were assessed. Each layer was prepared and applied as described in example 1 unless otherwise indicated.

The abrasion testing was carried out using a Taber 5131 Abraser fitted with a 500 grams load and CS-10F abrasive wheels. The sample is held onto a rigid plate, rotating about a vertical axis and the abrasive wheels are brought into contact with the sample. After 100 or 500 revolutions of the abraser wheels, Taber 100 and Taber 500 respectively, the transparency of the sample is reduced and the light transmitted through the sample is measured by a Gardner TCS Plus spectrophotometer to determine the percentage haze. In the terms of this test haze is defined as the percentage of transmitted light that deviates from the incident beam by more than 2.5% average. The lower the haze value the greater the abrasion resistance.

The results are tabulated in the following Table 9 wherein A is (MeO)$_3$Si—CH$_2$—CH$_2$—CH$_2$—NH—CH$_2$—CH$_2$—CH$_2$—Si(OMe)$_3$ and B is (MeO)$_3$Si—CH$_2$—CH$_2$—CH$_2$—NH—CH$_2$—CH$_2$—NH—CH$_2$—CH$_2$—CH$_2$—Si(OMe)$_3$.

TABLE 9

| Substrate | Coating | Taber 100 (%) | Taber 500 (%) |
|---|---|---|---|
| OPP | UNCOATED | | 62 |
| OPP | A/Butane(COOH)$_4$ (3:2 w/w) | 3.5 | 52.0 |

TABLE 9-continued

| Substrate | Coating | Taber 100 (%) | Taber 500 (%) |
|---|---|---|---|
| OPP | A/Benzene(COOH)$_4$ (1:1 w/w) | | 17.0 |
| OPP | A | | 8.0 |
| OPP | B | 3.0 | 7.0 |

Other variations may be made in compounds, compositions, and methods described herein without departing from the essential features of the invention. The embodiments of the invention specifically illustrated herein are exemplary only and not intended as limitations on their scope except as defined in the appended claims.

What is claimed is:

1. A process for treating a surface of a substrate with a compound of the formula $$R_aX_{3-a}Si\text{—}Z\text{—}SiX_{3-a}R_a$$

in which Z is R'NH(R'NH)$_p$R'; and wherein each R is selected from the group consisting of a hydrogen atom and a hydrocarbon group; each X is selected from the group consisting of an alkoxy group with 1 to 4 carbon atoms, a halogen atom, an oxime group or an acyloxy group; each R' is a divalent hydrocarbon group having 1 to 12 carbon atoms; a is from 0 to 3; and p is 0 or 1; the process comprising applying the compound in combination with i) an organic acid having two or more acid substituents, and wherein the organic acid is a polybasic carboxylic acid selected from the group consisting of itaconic acid, citric acid, succinic acid, butane tetracarboxylic acid, ethylene diamine tetracetic acid, ascorbic acid, tetrahydrofuran tetracarboxylic acid, cyclopentane tetracarboxylic acid, and benzene tetracarboxylic acid; or
  ii) a polymer or co-polymer of an unsaturated carboxylic acid selected from the group consisting of itaconic, citraconic, mesaconic, maleic, fumaric, acrylic, methacrylic, sorbic, and cinnamnic acid, to a substrate to form a coating layer, and curing the layer by exposure to moisture.

2. A process in accordance with claim 1 wherein each X is a methoxy group.

3. A process in accordance with claim 1 wherein a is 0.

4. A process in accordance with claim 1 wherein each R' contains from 2 to 3 carbon atoms.

5. A process in accordance with claim 1 wherein the compound is bis-(gamma-trimethoxysilylpropyl)amine.

6. A process in accordance claim 1 wherein the compound is applied in a solvent selected from the group consisting of an alcohol, an ether, an ester, a hydrocarbon, and water.

7. A process in accordance with claim 6 wherein the solvent is methanol.

8. A process in accordance with claim 1 wherein the compound is applied in combination with a filler selected from the group consisting of a silicone resin, silica, magnesium oxide, clay, diatomaceous earth, calcium carbonate, ground quartz, and silicon containing nanoparticles.

9. A process in accordance with claim 1 wherein the substrate is selected from the group consisting of polyolefins, polystyrene, polyvinyl alcohol, polyacrylonitrile, polyvinyl chloride, polyvinyl dichloride, polyvinylidene chloride, and polyacrylates.

10. A process in accordance with claim 1 wherein the substrate is selected from the group consisting of polyesters, polyamides, and polyimides.

11. A process in accordance with claim 1 wherein the substrate is selected from the group consisting of polysaccharides, regenerated cellulose, glassine, clay coated paper, paperboard, and craft paper.

12. A process in accordance with claim 1 wherein the substrate has a layer of metal or metal oxide deposited thereon.

13. A process in accordance with claim 1 wherein the layer is heated at a temperature of from 60 to 110° C. upon exposure to moisture.

14. A process in accordance with claim 1 wherein the coating layer is applied in an amount of from 0.5 to 3 g/m$^2$.

* * * * *